United States Patent Office
3,812,098
Patented May 21, 1974

3,812,098
O²,2'-ANHYDRO - 1 - (β-D-ARABINOFURANOSYL)-
CYTOSINE DERIVATIVES AND METHODS OF
MAKING AND RELATED PROCEDURES
John G. Moffatt, Los Altos, and Alan F. Russell, San
Francisco, Calif., assignors to Syntex (U.S.A.) Inc.,
Palo Alto, Calif.
No Drawing. Continuation-in-part of application Ser. No.
21,206, Mar. 19, 1970, now Patent No. 3,709,874.
This application Mar. 3, 1972, Ser. No. 231,711
Int. Cl. C07d 51/52
U.S. Cl. 260—211.5 R     15 Claims

ABSTRACT OF THE DISCLOSURE

5'-O-dioxolanyl derivatives of O²,2'-anhydro-1-(3'-O-acyl-β-D-arabinofuranosyl) - cytosines; methods of preparing such compounds, methods of selectively cleaving the 5'-O-dioxolanyl or 3'-O-acyl group from such derivatives and methods of preparing 1-(β-D-arabinofuranosyl)-cytosines. The aforementioned compounds are prepared and isolated as pharmaceutically acceptable salts. The 3'-O-acyl-5'-O-dioxolanyl derivatives are prepared by treating the corresponding cytosine ribonucleosides with an α-acyloxy acyl halide. The 3'-O-acyl-5'-O-dioxolanyl derivatives are converted to the corresponding O²,2'-anhydro-1-(3' - O - acyl-β-D-arabinofuranosyl)-cytosines and/or O²,2'-anhydro - 1 - (β-D-arabinofuranosyl)-cytosines by selective acid hydrolysis. The aforementioned 5'-O-dioxolanyl derivatives can also be converted to the corresponding 1-(β-D-arabinofuranosyl) - cytosines by basic hydrolysis. The aforementioned compounds and salts exhibit anti-viral and cytotoxic activity and are useful for the treatment of mammals where such agents are indicated.

CROSS REFERENCE TO RELATED
APPLICATIONS

This application is a continuation-in-part of U.S. application Ser. No. 21,206, filed Mar. 19, 1970, now Pat. No. 3,709,874.

BACKGROUND OF THE INVENTION (1) Field of the invention

This invention relates to 5'-O-dioxolanyl derivatives of the salts of O²,2'-anhydro-1-(3' - O - acyl-β-D-arabinofuranosyl)-cytosines and to methods of preparing such derivatives. In a further aspect this invention relates to methods of preparing salts of O²,2'-anhydro-1-(3'-O-acyl-β-D-arabinofuranosyl)-cytosines. In a still further aspect, this invention relates to methods of preparing salts of O²,2'-anhydro - 1 - (β-D-arabinofuranosyl)-cytosines. In another aspect this invention relates to methods of preparing 1-(β-D - arabinofuranosyl)-cytosines and derivatives and salts thereof.

(2) The prior art

In our prior applicatiion, U.S. Ser. No. 21,206, filed Mar. 19, 1970, we discolsed novel O²,2-anhydro-1-(3'-O-acyl-β-D-arabinofuranosyl)-cytosine salts, which we prepared by treatment of the corresponding cytidine deivatives with a suitable α-acyloxy acyl halide. We have now discovered that the intermediate reaction mixture, afforded by this treatment, also contains novel 5'-O-dioxolanyl derivatives of O²,2'-anhydro-1-(3'-O-acyl-β-D-arabinofuranosyl)-cytosine which we have accordingly now isolated.

The salts of O²,2'-anhydro-1-(β-D-arabinofuranosyl)-cytosine and its 5-halo, 5-lower alkyl and 5-halo(lower alkyl)-cytosine derivatives are known (note, for example, Walwick et al., Proc. Chem. Soc. 84 (1959) and U.S. Pat. No. 3,463,850). However, because of the instability under even mild basic conditions of the parent compounds, and also the relative insolubility of the salts in most inert organic solvents, these salts cannot be selectively acylated at the 3'-position by conventional nucleoside acylation procedures. For example, treatment of the salts of O²,2'-anhydro - 1 - (β-D-arabinofuranosyl)-cytosine and their derivatives, with even such mild bases as aqueous pyridine or aqueous sodium bicarbonate-carbonate buffer, causes neutralization of the salt to give the unstable free base which decomposes with cleavage of the O²,2'-anhydro linkage. Also attempted acylation with acyl anhydrides in pyridine results in extensive decomposition.

We have also further discovered that the 5'-O-dioxolanyl derivatives of our invention exhibit a different spectrum of pharmaceutical activities and selectivities than the corresponding 5'-unsubstituted O²,2' - anhydro-1-(β-D-arabinofuranosyl)-cytosines.

SUMMARY OF THE INVENTION

In summary the compounds of the invention can be represented by the following generic formula:

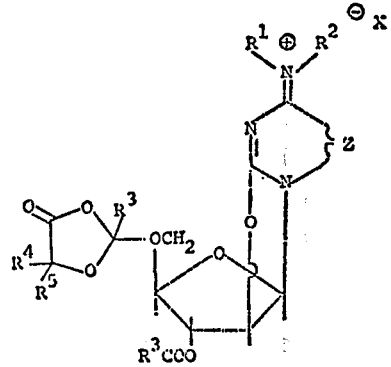

wherein R¹ and R² are independently selected from the group of hydrogen, lower alkyl, aryl or lower alkylaryl, R³ is lower alkyl, cycloalkyl; X is halo or other pharmaceutically acceptable anion, Z is the group

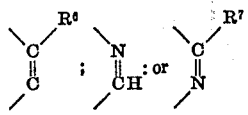

wherein R⁶ is hydrogen, halo, lower alkyl, lower hydroxyalkyl, trifluoromethyl, azido, nitro, amino, lower alkylamino, or aylamino and R⁷ is hydrogen or methyl and wherein when Z is

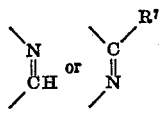

then R¹ and R² are independently selected from the group of hydrogen or lower alkyl; one of R⁴ and R⁵ is lower alkyl or aryl and the other is hydrogen, lower alkyl or aryl, or $R^4$ and $R^5$ together with the carbon atom to which they are joined form a cycloalkyl having from 4 through 8 ring atoms or a heterocycle having from 5 through 7 ring atoms containing one or two hetero ring atoms independently selected from the group consisting of nitrogen, oxygen and sulfur.

In summary, the process, according to our invention of preparing the chloride, bromide, and iodide salts of formula I, comprises treating the corresponding cytosine ribonucleosides or suitable derivatives thereof with a suitable α-acyloxy acid halide. The resulting products of formula I can be separated and further purified by any suitable method such as, for example, liquid-liquid extraction, and/or crystallization. The fluoride salts, and preferably also the iodide salts, of formula I can be prepared by ion exchanging the corresponding chloride or bromide salt of formula I with the desired fluoride or iodide ion. Similarly, other pharmaceutically acceptable salts can also be prepared by ion exchange with the particular pharmaceutically acceptable ion desired.

In summary, the process according to our invention of preparing $O^2,2'$ - anhydro - 1 - (3'-O-acyl-β-D-arabinofuranosyl)-cytosines comprises selective mild acid hydrolysis of the corresponding compounds of formula I at moderate temperatures for a carefully controlled period. The $O^2,2'$-anhydro-1-(β-D-arabinofuranosyl)-cytosine derivatives can be prepared by continuing the hydrolysis, under the same conditions, for a substantially increased period of time and/or by increasing the strength of the acid.

In summary the process of our invention for preparing 1-(β-D-arabinofuranosyl)-cytosine derivatives comprises treating salts of the corresponding $O^2,2'$-anhydro-1-(5'-O-dioxolanyl - β - D-arabinofuranosyl)-cytosine derivatives with an alkaline solution for a sufficient period to effect cleavage of the 5'-O-dioxolanyl group and the $O^2,2'$-anhydro bridge. The salts can then be prepared, if desired, by conventional acid treatments optionally followed by conventional ion exchange if different salts are desired.

The invention is further discussed herein below.

FURTHER DESCRIPTION OF THE INVENTION AND PREFERRED EMBODIMENTS

The compounds of our invention can be represented by the following sub-generic formulas:

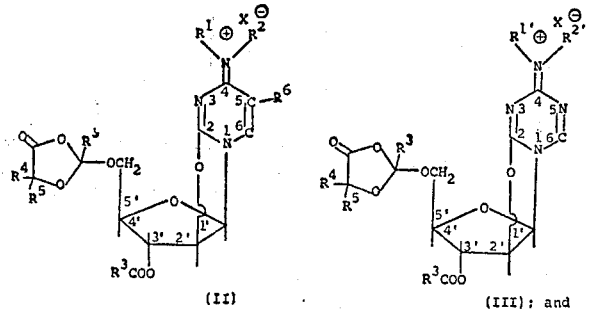

(II)    (III); and

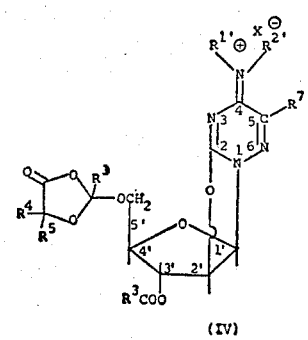

(IV)

wherein $R^1$ and $R^2$ are independently selected from the group of hydrogen, lower alkyl, aryl, or lower alkylaryl; $R^{1'}$ and $R^{2'}$ are independently selected from the group of hydrogen and lower alkyl; $R^3$ is selected from the group of lower alkyl, or cycloalkyl having 3 through 6 ring atoms or heterocyclic having from 5 through 7 ring atoms and having 1 or 2 hetero ring atoms independently selected from the group of oxygen, nitrogen, and sulfur; $R^4$ and $R^5$ are independently selected from the group of lower alkyl, aryl, or lower alkylaryl and wherein when one of $R^4$ or $R^5$ is aryl or lower alkylaryl the other can be hydrogen or lower alkyl or aryl; or $R^4$ and $R^5$ together with the carbon atom to which they are joined form a cycloalkyl having from 4 through 8 ring atoms or a heterocycle having from 5 through 7 ring atoms containing one or two hetero ring atoms independently selected from the group consisting of nitrogen, oxygen, and sulfur; $R^6$ is hydrogen, halo, lower alkyl, lower hydroxyalkyl, trifluoromethyl, azido, nitro, amino, lower alkylamino, lower dialkylamino, or acylamino; $R^7$ is hydrogen or methyl; and X is a pharmaceutically acceptable anion, for example, halide.

As used herein above and below, the following terms have the following meanings unless expressly stated to the contrary. The term lower alkyl refers to alkyl groups having about from 1 through 6 carbon atoms, and includes both straight and branched chain groups. The term cycloalkyl refers to cycloalkyl groups having about from 3 through 6 ring atoms. Typical cycloalkyl groups thus include, for example, cyclopropyl, cyclohexyl, and the like. The term aryl refers to groups containing an aromatic ring such as, for example, phenyl and substituted phenyls, and having about from 6 to 20 carbon atoms. The term aryloxy refers to ether groups having at least one aryl substituent. The term heterocyclic refers to both saturated and unsaturated heterocyclic compounds containing one or two hetero ring atoms independently selected from the group of oxygen, nitrogen and sulfur, and having about from 5 through 7 ring atoms. Typical heterocyclic groups include, for example, thienyl, pyrrolyl; furyl; pyrazolyl; thiazolyl; morpholino; piperidinyl; piperazinyl; and the like. The term lower alkylaryl refers to groups having an aromatic ring containing 1 or more lower alkyl substituents and having a total (ring+alkyl) of 7 to 30 carbon atoms. Attachment of the alkylaryl group to the nucleoside group is via attachment through the alkyl substituent. The term lower hydroxyalkyl refers to lower alkyls having one or more hydroxy substituents. The term halo refers to fluoro, chloro, bromo, and iodo. The term acylamino refers to the group having the formula

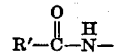

wherein R' is hydrogen, alkyl groups having from 1 through 10 carbon atoms, aryl (as defined herein above) or alkylaryl (as defined herein above). The term alkyl amino refers to the group

wherein one of R' or R'' is lower alkyl and the other is hydrogen. The term lower dialkylamino refers to the group

wherein R' and R'' are independently selected from the group of lower alkyls. The term pharmaceutically acceptable anion refers to anions which do not significantly adversely affect pharmaceutical properties such as, for example, derived from inorganic or organic acids such as, for example, hydrofluoric, hydrobromic, hydroiodic, sulfuric, phosphoric, lactic, benzoic, acetic, propionic, maleic malic, tartaric, citric, succinic, ascorbic; acids and the like. Preferred pharmaceutically acceptable anions include bromide chloride, sulfate, phosphate, acetate, lactate and the like.

Illustrations of typical compounds (salts) represented by formulas II, III and IV, of our invention, can be conveniently had by reference to the examples set forth herein below.

The preferred compounds (salts) of our invention are those wherein $R^3$ is a lower alkyl group having from 1 through 3 carbon atoms and especially wherein $R^3$ is methyl.

The pharmaceutically acceptable salts of the following compounds of our invention are particularly preferred:

$O^2,2'$-anhydro-1-[3'-O-acetyl-5'-O-(2,4,4-trimethyl-1,3-dioxolan-5-on-2-yl)-$\beta$-D-arabinofuranosyl]-cytosine;
$O^2,2'$-anhydro-1-[3'-O-propionyl-5'-O-(2-ethyl-4,4-dimethyl-1,3-dioxolan-5-on-2-yl)-$\beta$-D-arabinofuranosyl]-cytosine; and
$O^2,2'$-anhydro-1-[3'-O-butyryl-5'-O-(2-propyl-4,4-dimethyl-1,3-dioxolan-5-on-2-yl)-$\beta$-D-arabinofuranosyl]-cytosine.

The process according to our invention of preparing the chloride, iodide and bromide salts of formula I can be represented by the following overall schematic reaction equation:

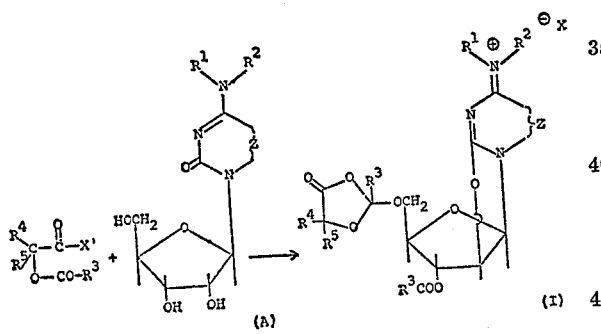

wherein X' is chloride, bromide, or iodide; and $R^1$, $R^2$, $R^3$, $R^4$, $R^5$ and Z have the same meaning as set forth herein above.

Considering the above process in greater detail, the halide salt compounds of formula I, other than the fluoride salt compounds, can be prepared according to our invention by treating the corresponding cytidine or cytidine derivatives or analogs (formula A) with an $\alpha$-acyloxy acyl chloride, bromide, or iodide of formula B. Typically, the treatment is conducted in an inert organic solvent at temperatures in the range of about from 0° to 100° C. for about from 5 minutes to 20 hours. We have found that with respect to the lower $\alpha$-acyloxy acyl halides (i.e., about 2 to 6 carbon atoms in the acyl group) that best results are obtained using temperatures in the range of about from 20 to 45° C. and treatment durations in the range of about from 1 to 20 hours. Longer treatment durations are typically required with lower treatment temperatures. The relative ratio of reactants is typically in the range of about from 2 to 5 moles of $\alpha$-acyloxy acid halide (formula B) per mole of cytidine compound (formula A), though mole ratios both above and below this can also be used. Best results are obtained using mole ratios in the range of about from 2 to 4 moles of $\alpha$-acyloxy acyl halide (formula B) per mole of cytidine compound (formula A). In terms of ease of preparation and convenience of isolation of the products, we have found that best results are obtained by preparing the chloride or bromide salts of formula I. Suitable inert organic solvent which can be used include, for example, acetonitrile, nitromethane, ethyl acetate, chloroform, 1,2-dimethoxyethane, dimethylformamide, dimethyl carbonate and the like. We have found particularly good results to be obtained using acetonitrile. Suitable $\alpha$-acyloxy acyl halides which can be used include, for example, $\alpha$-acetoxyisobutyryl chloride; 2-acetoxy-2-methylbutyryl chloride; 1-acetoxycyclohexyl carbonyl chloride; 2-acetoxy-2-$\beta$-furanylpropionyl chloride and the like. The halide salt product (formula I) can be separated from the reaction mass and/or purified by any suitable procedure such as, for example, liquid-liquid extraction, precipitation, crystallization, etc., the details of which procedures are well within the scope of one having ordinary skill in the art. Typically, liquid-liquid extraction with a two-phase aqueous organic solvent extraction medium such as, for example, water-ethyl ether, or direct precipitation with ethyl ether, has proved to be a convenient separation procedure, since many compounds of formula I are typically soluble in the aqueous phase and essentially insoluble in the organic phase as compared to the reactants and by-products, while many of the by-products are typically soluble in the organic phase and essentially insoluble in the aqueous phase as compared with the compounds of formula I.

The cytidine, or cytidine analogs and/or derivative starting materials, are known materials and can be obtained from commercial sources or prepared according to any suitable procedure. Further information regarding the starting materials and their preparation can, for example, be obtained from the literature wherein many such processes are either expressly outlined or would be apparent to one having ordinary skill in the art, note for example, The Chemistry of Nucleosides and Nucleotides, A. M. Michelson, Academic Press (1963); Synthetic Procedures in Nucleic Acid Chemistry, vol. 1, Zorbach and Tipson, John Wiley & Sons (1968); Collection of Czechoslovakian Chemical Communications, vol. 30, page 205 (1965) and U.S. Pat. 3,282,921. Suitable cytidine or cytidine analogs and/or derivative starting materials include, for example, cytidine; 5-azacytidine; 6-azacytidine; 5-chlorocytidine; 5-bromocytidine; 5-iodocytidine; 5-trifluoromethylcytidine; 5-nitrocytidine; and 5-methyl-6-azacytidine.

The $\alpha$-acyloxy acyl halide starting materials of formula (B) can, for example, be prepared by the methods described in the parent application, U.S. Ser. No. 21,206, filed Mar. 19, 1970, and in U.S. Pat. No. 3,539,550.

As can be seen from the above schematic reaction equation, the particular halide form of $\alpha$-acyloxy-acyl halide used will determine the particular quaternary halide salt form of the product (formula I) obtained. Thus, where an $\alpha$-acyloxy-acyl chloride is used, the resulting quaternary chloride salt form of the compounds of formula I will be obtained. Alternatively, the quaternary halide salts of formula I can be converted to different halide salts by any suitable procedure for effecting the replacement or exchange of one halide with another (e.g., replacement of chloride with fluoride). We have further found that the iodide and particularly the fluoride salts of our invention are best prepared in this manner. The ion exchange can, for example, be conveniently effected by treating an aqueous solution of the halide (typically chloride or bromide) salt of formula I with an ion exchange resin in the desired halide form (typically fluoride or iodide). Suitable solvents for this purpose include, for example, water, aqueous methanol, and the like.

Similarly, other pharmaceutically acceptable salts can be prepared by any suitable procedure for effecting exchange of the salt ion (i.e., $X^\ominus$) of the compound of formula I with the desired pharmaceutically acceptable ion. Again, this can be conveniently effected through treatment of a solution of the salt of formula I with an ion exchange resin in the desired anion form.

The selective acid hydrolysis process of our invention can be represented by the following schematic overall reaction equation:

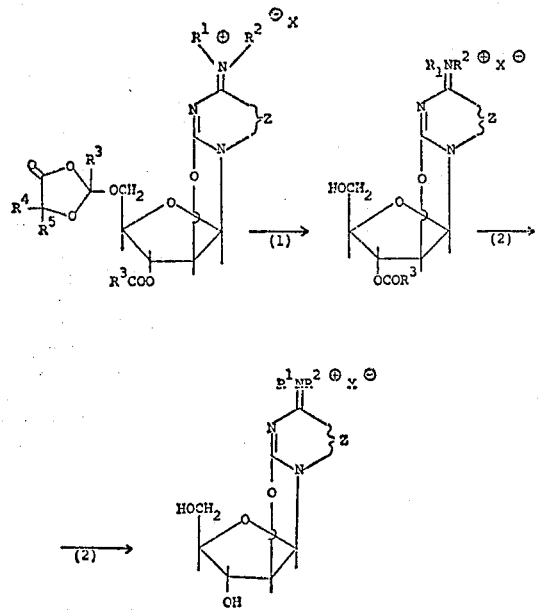

wherein $R^1$, $R^2$, $R^3$, $R^4$, $R^5$, X and Z have the same meaning as set forth herein above.

Step 1 of the above process can be effected by treating the salt of formula I, in a suitable hydroxylic solvent, under mild acid conditions. Typically this treatment is conducted at temperatures in the range of about from 0 to 40° C. for about from ½ to 5 hours. Best results are obtained using temperatures in the range of about from 20 to 30° C. for about from ½ to 2 hours. Suitable hydroxylic solvents which can be used include, for example, water; methanol; ethanol and the like and mixtures thereof. The preferred solvent is anhydrous methanol. Typically a concentration of strong acid in the range of about from 0.02 to 0.3 normal is used. Suitable acids which can be used include, for example, hydrogen chloride; hydrogen bromide; anhydrous methanolic sulfuric acid; methanolic trifluoroacetic acid; and the like. However, where an acid and nucleoside salt having different anions are used, the resulting product will be a mixture of different salts. Thus, for example, treatment of a nucleoside hydrogen chloride salt with sulfuric acid will yield a product mixture of chloride and sulfate salts. In this instance a single salt form can be obtained by subjecting the mixed salt to ion exchange with the appropriate anion. Best results are typically obtained by using hydrogen chloride in anhydrous methanol at a concentration in the range of about from .05 to 0.3 normal. This solution can be conveniently prepared either from gaseous hydrogen chloride and methanol or by dissolving the requisite amount of acetyl chloride in methanol.

Further, since increasing acid concentration and/or treatment temperature will increase the rate of reaction, lower treatment times should be used where higher acid concentrations and/or higher treatment temperatures are used, in order to prevent undesired cleavage of the 3'-O-acyl group or ultimate cleavage of the $O^2,2'$-anhydro bridge. Optimum conditions, for any given treatment, can be obtained by routine trial and error experimentation of a monitored reaction mixture. Such optimization is well within the scope of those having ordinary skill in the art.

The resulting product can, for example, be conveniently separated and isolated by evaporation of the solvent and/ or precipitation with ethyl ether or by evaporation of the solvent followed by partitioning of the residue between water and ethyl ether and isolation of the product from the aqueous phase.

Step 2, preparation of $O^2,2'$-anhydro-1-($\beta$-D-arabinofuranosyl)-cytosines, can be conveniently effected via the same procedure as set forth herein above with respect to step 1, but, in this instance, the treatment is conducted for about from 48 to 96 hours and preferably about from 60 to 70 hours. Alternatively, any appropriate combination of increasing acid concentration, and/or treatment temperatures and/or treatment times of the conditions for step 1 can be used.

The resulting product can, for example, be conveniently separated and isolated by evaporation of the solvent followed by trituration with ethyl ether. The resulting product can then be crystallized from a suitable solvent mixture such as, for example, methanol-chloroform.

It is particularly important that the respective treatment durations or conditions, with respect to steps 1 and 2, are carefully followed, depending upon whether the 3'-O-acyl or 3'-unsubstituted product is desired, as otherwise a mixture of the 3'-O-acyl and 3'-unsubstituted products, which would be extremely difficult to separate by conventional separation and purification procedures, would be obtained.

The compounds (salts) of formula I can also be converted, according to our invention, into the corresponding 1-($\beta$-D-arabinofuranosyl)-cytosine nucleosides by hydrolysis with an alkaline solution (typically an aqueous solution). The hydrolysis treatment is typically conducted at temperatures in the range of about from 0 to 100° C. for about from 1 to 24 hours. Best results are obtained using temperatures in the range of about from 20 to 50° C. and treatment durations of about from 1 to 10 hours. The ratio of reactants is typically in the range of about from .1 to .5 moles of the compound of formula I per mole of active hydroxide, though mole ratios both above and below this can be used. Typically the relative quantity and concentration of alkaline solution will be adjusted to provide a reaction solution having a pH in the range of about 10 to 14. Suitable alkaline solutions which can be used include, for example, sodium hydroxide, potassium hydroxide, ammonium hydroxide, tetramethylammonium hydroxide and the like. The resulting arabinofuranosylcytosine compounds can be separated from the reaction mass and further purified by any suitable procedure such as, for example, ion exchange chromatography, chromatography on cellulose or silicic acid, and crystallization. Where a volatile base such as, for example, ammonium hydroxide is used, the 1-$\beta$-D-arabinofuranosylcytosine compounds can be conveniently separated from the reaction mass by vacuum evaporation of the alkaline solution, and the product residue further purified, if desired, by crystallization of either the free nucleoside or salt thereof.

Also while the treatment can be effected by treating the salts of formula I *in situ* best results are obtained and by-products minimized by separating the products of formula I from the initial reaction mass prior to the hydrolysis treatment.

The 1-$\beta$-D-arabinofuranosyl cytosines are known to be pharmaceutically useful for their anti-viral and cytotoxic activity. Further information concerning the pharmaceutical application of these compounds can be had by reference to the literature of the art such as, for example, U.S. Pat. 3,462,416 (note columns 5-6 and 19-20). The $O^2,2'$-anhydro-1-($\beta$-D-arabinofuranosyl)-cytosines and their 3'-O-acyl and 3',5'-di-O-acyl derivatives exhibit anti-viral activity and cytotoxic activity in mammals and are especially useful in the treatment of mammals infected with DNA viral diseases such as herpes, polyoma, and vaccina. The compounds of our invention (formula I) also exhibit antiviral activity and cytotoxic activity in mammals and similarly are useful in the treatment of mammals infected with DNA viral diseases such as herpes, polyoma, and vaccina. Further as the compounds of formula I exhibit a different spectrum of intensities and selectivities of antiviral and cyclotoxic activities as compared with the corresponding $O^2,2'$-anhydro-1-($\beta$-D-arabinofuranosyl) - cytosines they serve as a useful complement to the existing pharmaceutical agents available in this area. The compounds can be administered either orally or parenterally in a suitable pharmaceutical carrier. The preferred dosage will, of course, vary with the particular subject and condition being treated, but typically will be in the range of about from 50 to 500 mg./kg. of body weight.

A further understanding of the invention can be had from the following non-limiting examples. Also where required, examples are repeated to provide sufficient quantities of starting materials for subsequent examples. The term room temperature or ambient temperature as used herein above and below refers to about 20° C.

Example 1

This example illustrates methods, according to our invention, of preparing chloride salts of our invention. In this example a suspension containing 24.3 g. (0.1 mol) of cytidine and 65.8 g. (0.4 mol) of $\alpha$-acetoxyisobutyryl chloride in 200 ml. of anhydrous acetonitrile, is stirred at room temperature until a clear solution is obtained (i.e., about 2.5 to 3 hours). One liter of ethyl ether is then added resulting in the formation of a precipitate which is collected by filtration and washed with two 500 ml. portions of ethyl ether affording essentially pure $O^2,2'$-anhydro-1-[3'-O-acetyl-5'-O-(2,4,4-trimethyl - 1,3 - dioxolan-5-on-2-yl)-$\beta$-D-arabinofuranosyl]-cytosine hydrochloride.

Similarly, following the same procedure as above but using the corresponding cytidine derivatives as starting materials, the following compounds are respectively prepared:

$O^2,2'$-anhydro-1-[3'-O-acetyl-5'-O-(2,4,4-trimethyl-1,3-dioxolan-5-on-2-yl)-$\beta$-D-arabinofuranosyl]-5-methylcytosine hydrochloride;
$O^2,2'$-anhydro-1-[3'-O-acetyl-5'-O-(2,4,4,-trimethyl-1,3-dioxolan-5-on-2-yl)-$\beta$-D-arabinofuranosyl]-5-fluorocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-fluorocytosine hydrochloride;
$O^2,2'$-anhydro-1-[3'-O-acetyl-5'-O-(2,4,4-trimethyl-1,3-dioxolan-5-on-2-yl)-$\beta$-D-arabinosfuranosyl]-5-chlorocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuransoyl]-5-hydroxymethylcytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-($\alpha$-hydroxyethyl)-cytosine hydrochloride;
$O^2,2'$-anhydro-[3'-O-acetyl-5'-O-(2,4,4-trimethyl-1,3-dioxolan-5-on-2-yl)-$\beta$-D-arabinofuranosyl]-5-trifluoromethyl-cytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl)-5-azidocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-nitrocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-aminocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuransoyl]-5-methylaminocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-acetamidocytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-5-azacytosine hydrochloride;
$O^2,2'$-anhydro-[3'-O-acetyl-5'-O-(2,4,4-trimethyl-1,3-dioxolan-5-on-2-yl)-$\beta$-D-arabinofuranosyl]-6-azacytosine hydrochloride;
$O^2,2'$-anhydro-1-[3'-O-acetyl-5'-O-(2,4,4-trimethyl-1,3-dioxolan-5-on-2-yl)-$\beta$-D-arabinofuranosyl]-$N^4$-methylcytosine hydrochloride; and
$O^2,2'$-anhydro-1-[3'-O-acetyl-5'-O-(2,4,4-trimethyl-1,3-dioxolan-5-on-2-yl)-$\beta$-D-arabinofuranosyl]-$N^4$-phenylcytosine hydrochloride.

Similarly by following the same procedure as above but respectively using $\alpha$-propionyloxy isobutyryl chloride; $\alpha$-butyryloxy isobutyryl chloride; and 1-acetoxycyclohexane carbonyl chloride in place of $\alpha$-acetoxyisobutyryl chloride, the corresponding 3' - O-propionyl-5'-O-(2-ethyl-4,4-dimethyl-1,3-dioxolan-5-on-2-yl)-; 3'-O-butyryl-5'-O-(2 - propyl-4,4-dimethyl-1,3-dioxolan-5-on-2-yl)- and 3'-O - acetyl - 5' - O - (2-methyl-4,4-pentamethylene-1,3-dioxolan-5-on-2-yl)- derivatives of each of the above products are respectively prepared.

Example 2

This example illustrates methods of preparing bromo salts of our invention. In this example a suspension containing 24.3 g. (0.1 mol) of cytidine and 83.6 g. (0.4 mol) of $\alpha$-acetoxyisobutyryl bromide in 200 ml. of anhydrous acetonitrile, is stirred at room temperature until a clear solution is obtained (i.e., about 1 to 2 hours). One liter of ethyl ether is then added resulting in the formation of a precipitate which is collected by filtration and washed with two 500 ml. portions of ethyl ether affording essentially pure $O^2,2'$-anhydro-1-[3'-O-acetyl-5'-O-(2,4,4 - trimethyl - 1,3 - dioxolan-5-on-2-yl)-$\beta$-D-arabinofuranosyl]-cytosine hydrobromide.

Similarly, following the same procedure as above but using the corresponding cytidine derivatives as starting materials, the following compounds are respectively prepared:

$O^2,2'$-anhydro-1-[3'-O-acetyl-5''-O-(2,4,4-trimethyl-1,3-dioxolan-5-on-2-yl)-$\beta$-D-arabinofuranosyl]-5-methylcytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-fluorocytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-iodocytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-chlorocytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-hydroxymethylcytosine hydrobromide;
$O^2,2'$-anhydro-1-[3'-O-acetyl-5'-O-(2,4,4-trimethyl-1,3-dioxolan-5-2-yl)-$\beta$-D-arabinofuranosyl]-5-($\alpha$-hydroxyethyl)-cytosine, hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-trifluoromethylcytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-azidocytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-nitrocytosine hydrobromide;
$O^2,2'$-anhydro-1-[3'-O-acetyl-5'-O-(2,4,4-trimethyl-1,3-dioxolan-5-on-2-yl)-$\beta$-D-arabinofuranosyl]-5-aminocytosine hydrobromide;

11

$O^2,2'$-anhydro-1-[3'-O-acetyl-5'-O-(2,4,4-trimethyl-1,3-dioxolan-5-on-2-yl)-β-D-arabinofuranosyl]-5-methylaminocytosine hydrobromide;

$O^2,2'$-anhydro-1-[3'-O-acetyl-5'-O-(2,4,4-trimethyl-1,3-dioxolan-5-on-2-yl)-β-D-arabinofuranosyl]-5-acetamidocytosine hydrobromide;

$O^2,2'$-anhydro-1-[3'-O-acetyl-5'-O-(2,4,4-trimethyl-1,3-dioxolan-5-on-2-yl)-β-D-arabinofuranosyl]-5-azacytosine hydrobromide;

$O^2,2'$-anhydro-1-[3'-O-acetyl-5'-O-(2,4,4-trimethyl-1,3-dioxolan-5-on-2-yl)-β-D-arabinofuranosyl]-6-azacytosine hydrobromide;

$O^2,2'$-anhydro-1-[3'-O-acetyl-5'-O-(2,4,4-trimethyl-1,3-dioxolan-5-on-2-yl)-β-D-arabinofuranosyl]-$N^4$-methylcytosine hydrobromide; and $O^2,2'$-anhydro-1-[3'-O-acetyl-5'-O-(2,4,4-trimethyl-1,3-dioxolan-5-on-2-yl)-β-D-arabinofuranosyl]-$N^4$-phenylcytosine hydrobromide.

Similarly by following the same procedure as above but respectively using α-propionyloxy-isobutyryl bromide; α-butyryloxy-isobutyryl bromide; and 1-acetoxycyclohexane carbonyl bromide in place of α-acetoxyisobutyryl bromide, the corresponding 3'-O-propionyl-5'-O-(2-ethyl-4,4-dimethyl-1,3-dioxolan-5-on-2-yl)-; 3'-O-butyryl-5'-O-(2-propyl-4,4-dimethyl-1,3-dioxolan-5-on-2-yl)- and 3'-O-acetyl-5'-O-(2 - methyl-4,4-pentamethylene-1,3-dioxolan-5-on-2-yl)- derivatives of each of the above products are respectively prepared.

Example 3

This examples illustrates the preparation of fluoride salts, of our invention, by ion exchange of the corresponding bromide salts of our invention with a fluoride ion.

In this example 20 ml. of an aqueous solution containing 1 g. of $O^2,2'$-anhydro-1-[3'-O-acetyl-5'-O-(2,4,4-trimethyl - 1,3 - dioxolan-5-on-2-yl)-β-D-arabinofuransoyl]-cytosine hydrobromide is passed through a column containing 50 ml. of a quaternary ammonium ion exchange resin, sold under the trademark Dowex 2, in the fluoride salt form. The resulting effluent and water washes are evaporated to dryness, under vacuum. The resulting residue is dissolved in methanol and crystallized by the addition of acetone affording $O^2,2'$-anhydro-1-[3'-O-acetyl-5'-O-(2,4,4 - trimethyl - 1,3 - dioxolan-5-on-2-yl)-β-D-arabinofuranosyl]-cytosine hydrofluoride.

Similarly by following the same procedure as above but using the respective bromide salts prepared, and enumerated in Example 2, respectively, the corresponding fluoride salts are respectively prepared.

Example 4

This example illustrates methods, according to our invention, of preparing $O^2,2'$-anhydro-1-(3'-O-acyl-β-D-arabinofuranosyl)-cytosines from the corresponding salts of our invention. In this example 10 g. of $O^2,2'$-anhydro-1-[3'-O-acetyl-5'-O-(2,4,4-trimethyl - 1,3 - dioxolan-5-on-2-yl)-β-D-arabinofuranosyl] - cytosine hydrochloride is dissolved in 400 ml. of anhydrous methanol. 150 ml. of 0.2 N methanolic hydrogen chloride is then added and the resulting solution is monitored by thin-layer chromatography on silicic acid using butanol-acetic acid-water (6:3:1, by volume), until absence of starting material is indicated (i.e., about 1 to ½ hour). The solution is then quickly evaporated, under vacuum, at about 20° C. yielding a crystalline solid. The solid is then briefly treated with 150 ml. of a 1:5 (volume) mixture of methanol and chloroform at 50° C., then cooled and filtered affording a residue of $O^2,2'$-anhydro-1-(3'-O-acetyl-β-D-arabinofuranosyl)-cytosine hydrochloride.

12

Similarly by following the same procedure as above using the corresponding products enumerated in Example 1 as starting material, the hydrochloride salts of the corresponding $O^2,2'$-anhydro-1-(3'-O-acyl-β - D - arabinofuranosyl)-cytosine derivatives are respectively prepared.

The above procedure is repeated but using a 0.2 Normal solution of sulfuric acid in methanol in place of a methanolic hydrogen chloride solution. In this instance the respective products are mixtures of sulfate salts and hydrochloride salts.

Example 5

This example illustrates methods, according to our invention, of preparing $O^2,2'$-cyclocytidine salts from the corresponding salts of our invention. In this example 10 g. of $O^2,2'$-anhydro-1-[3'-O-acetyl-5'-O-(2,4,4-trimethyl-1,3 - dioxolan-5-on-2-yl)-β-D-arabinofuranosyl]-cytosine hydrochloride is dissolved in 400 ml. of anhydrous 0.2 N methanolic hydrogen chloride. The resulting mixture is allowed to stand for 36 hours, and then evaporated to dryness. The resulting residue is briefly warmed with 150 ml. of methanol-chloroform (1:5 vol.) mixture at 40° C., then cooled and filtered affording a residue of $O^2,2'$-anhydro - 1 - (β - D - arabinofuranosyl)-cytosine hydrochloride.

Similarly by following the same procedure as above but using the corresponding compounds of Examples 1 and 2 as starting materials, the salts of the corresponding $O^2,2$-anhydro - 1 - (β-D-arabinofuranosyl)-cytosines are respectively prepared.

Example 6

This example illustrates methods, according to our invention, of preparing the corresponding 1-(β-D-arabinofuranosyl)-cytosines from the corresponding compounds of our invention. In this example a suspension of cytidine (24.3 g., 0.1 mole) and 2-acetoxy-2-isobutyryl chloride (65.6 g., 0.4 mole) in acetonitrile (500 ml.) is stirred at room temperature for 4 hours yielding a clear solution. The solution is then evaporated under vacuum affording a syrup which is then thoroughly triturated with ether and filtered. The resulting precipitate is further washed with ether giving essentially pure $O^2,2'$-anhydro-1-[3'-O-acetyl-5'-O-(2,4,4-trimethyl-1,3-dioxolan - 5 - on-2-yl)-β-D-arabinofuranosyl]-cytosine. This product is then dissolved in 250 ml. of 3 N aqueous ammonium hydroxide and stirred for 16 hours at room temperature. A sample is then taken and evaporated and examined by ultraviolet spectrum analysis, at pH 2, revealing a single peak at 280 mμ. The aqueous ammonium hydroxide solvent is then evaporated under vacuum and the resulting residue co-evaporated with methanol to remove excess ammonia. The residue is dissolved in water and passed through a column containing 25 ml. of an ion exchange resin (H+ form), sold under the trademark Dowex 50. The resin is thoroughly washed with water and then eluted with 3 N ammonium hydroxide. The ultra-violet absorbing fractions are pooled and evaporated to dryness and then co-evaporated with methanol to remove ammonia. The resulting residue is dissolved in hot ethanol and 40 ml. of 3 N methanolic hydrogen chloride is added yielding crystalline 1-(β-D-arabinofuranosyl)-cytosine hydrochloride which is then recoverewd by filtration and further purified by recrystallization from methanol.

Similarly by following the same procedure but respectively using the products of Example 1 as starting material for the above aqueous ammonia treatment, the corresponding 1-(β-D-arabinofuranosyl)-cytosine hydrochloride salts are respectively prepared.

Obviously many modifications and variations of the invention, described herein above and below in the claims, can be made without departing from the essence and scope thereof.

What is claimed is:
1. A compound selected from the group having the formulas:

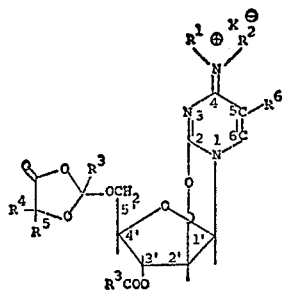

II;

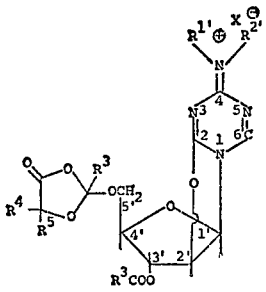

III; and

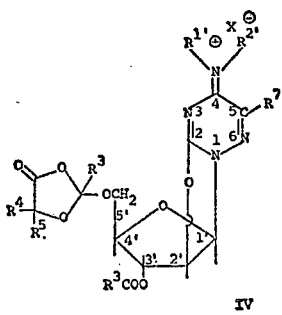

IV wherein $R^1$ and $R^2$ are independently selected from the group of hydrogen, lower alkyl, aryl having about from 6 to 20 carbon atoms, or lower alkylaryl having a total of 7 to 30 carbon atoms;

$R^{1'}$ and $R^2{}_2$ are independently selected from the group of hydrogen and lower alkyl;

$R^3$ is selected from the group of lower alkyl, cycloalkyl having from 3 through 6 ring atoms or heterocyclic having from 5 through 7 ring atoms and containing 1 or 2 hetero ring atoms independently selected from the group of oxygen, nitrogen, and sulfur;

$R^4$ and $R^5$ are independently selected from the group of lower alkyl, aryl having about from 6 to 20 carbon atoms, or lower alkylaryl having a total of from 7 through 30 carbon atoms and wherein when one of $R^4$ or $R^5$ is aryl or lower alkylaryl the other can be hydrogen or lower alkyl or aryl about from 6 to 20 carbon atoms; or $R^4$ and $R^5$ together with the carbon atom to which they are joined form a cycloalkyl having from 4 through 8 ring atoms or a heterocycle having from 5 through 7 ring atoms containing one or two hetero ring atoms independently selected from the group consisting of nitrogen, oxygen and sulfur;

$R^6$ is hydrogen, halo, lower alkyl, lower hydroxyalkyl, trifluoromethyl, azido, nitro, amino, lower alkylamino, lower dialkylamino, or acylamino having the formula

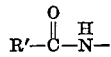

wherein R' is hydrogen, alkyl groups having from one to 10 carbon atoms, aryl having about from 6 to 20 carbon atoms or arylalkyl having a total of 7 to 30 carbon atoms;

$R^7$ is hydrogen or methyl; and

X is a pharmaceutically acceptable anion.

2. The compound of claim 1 of formula II.
3. The compound of claim 2 wherein $R^3$ is methyl, ethyl or propyl.
4. The compound of claim 3 wherein $R^3$ is methyl.
5. The compound of claim 2 wherein said compound is a pharmaceutically acceptable salt of $O^2,2'$-anhydro-1-[3'-O-acetyl-5'-O-(2,4,4-trimethyl - 1,3 - dioxolan-5-on-2-yl)-β-D-arabinofuranosyl]-cytosine.
6. The compound of claim 2 wherein said compound is a pharmaceutically acceptable salt of $O^2,2'$-anhydro-1-[3'-O-propionyl-5'-O-(2-ethyl - 4,4 - dimethyl-1,3-dioxolan-5-on-2-yl)-β-D-arabinofuranosyl]-cytosine.
7. The compound of claim 2 wherein said compound is a pharmaceutically acceptable salt of $O^2,2'$-anhydro-1-[3'-O-butyryl-5'-O-(2-propyl - 4,4 - dimethyl-1,3-dioxolan-5-on-2-yl)-β-D-arabinofuranosyl]-cytosine.
8. The compound of claim 1 of formula III.
9. The compound of claim 8 wherein $R^3$ is methyl, ethyl or propyl.
10. The compound of claim 8 wherein $R^3$ is methyl.
11. The compound of claim 1 of Formula IV.
12. The compound of claim 11 wherein $R^3$ is methyl, ethyl or propyl.
13. The compound of claim 11 wherein $R^3$ is methyl.
14. The compound of claim 1 wherein X is a halide anion.
15. The compounds of claim 1 wherein X is a chloride anion.

References Cited
UNITED STATES PATENTS

| | | | |
|---|---|---|---|
| 3,463,850 | 8/1969 | Shen et al. | 260—211.5 R |
| 3,658,788 | 4/1972 | Orgel et al. | 260—211.5 R |
| 3,709,874 | 1/1973 | Moffatt et al. | 260—211.5 R |

JOHNNIE R. BROWN, Primary Examiner

U.S. Cl. X.R.
424—180